Oct. 13, 1931.　　　　G. A. FRANKS　　　　1,827,312
SLUG AND CHANGE MAKING MACHINE
Filed Feb. 4, 1929　　　5 Sheets-Sheet 1
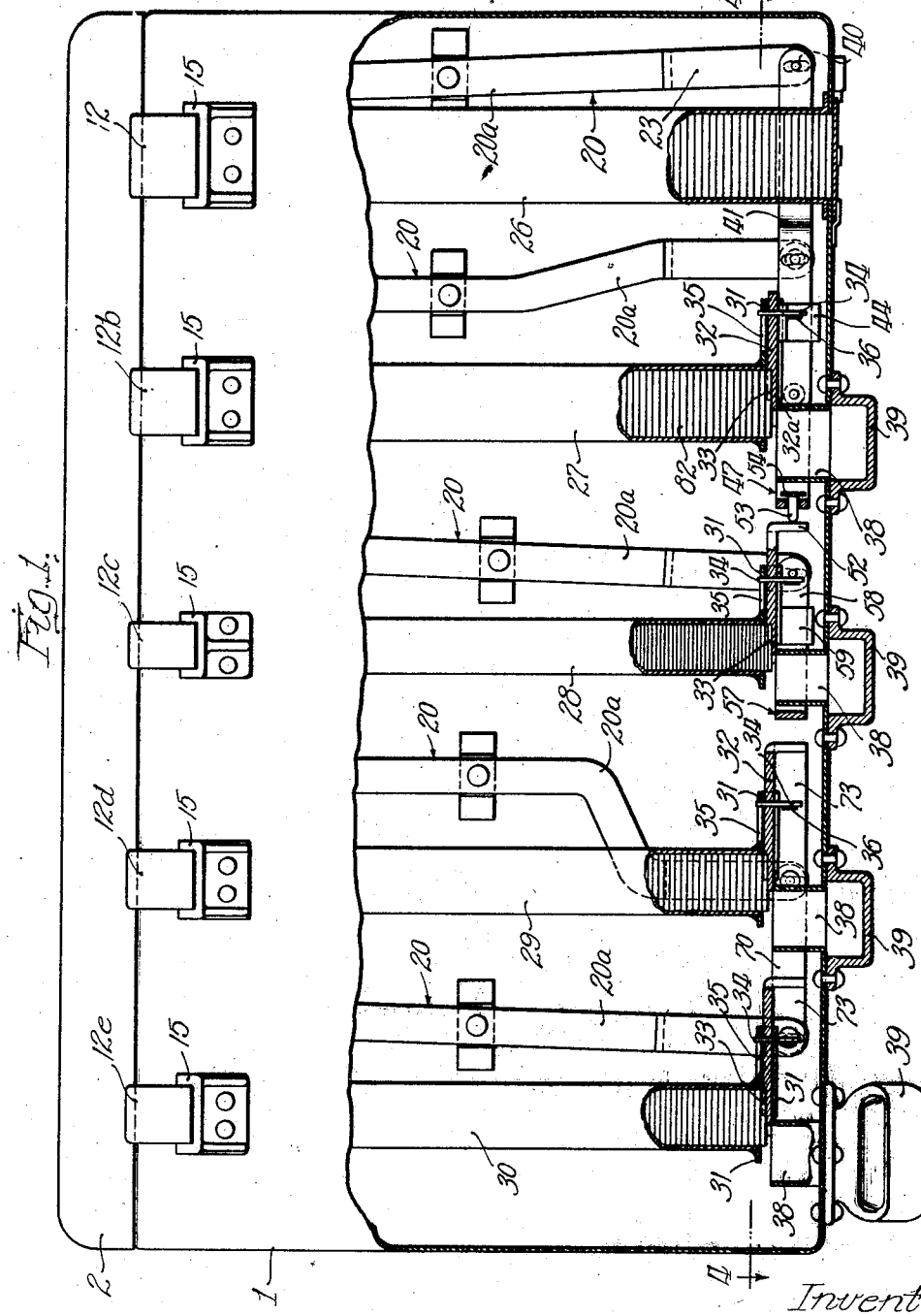
Inventor
George A. Franks
By Brown, Jackson, Boettcher & Dienner.
Attys.

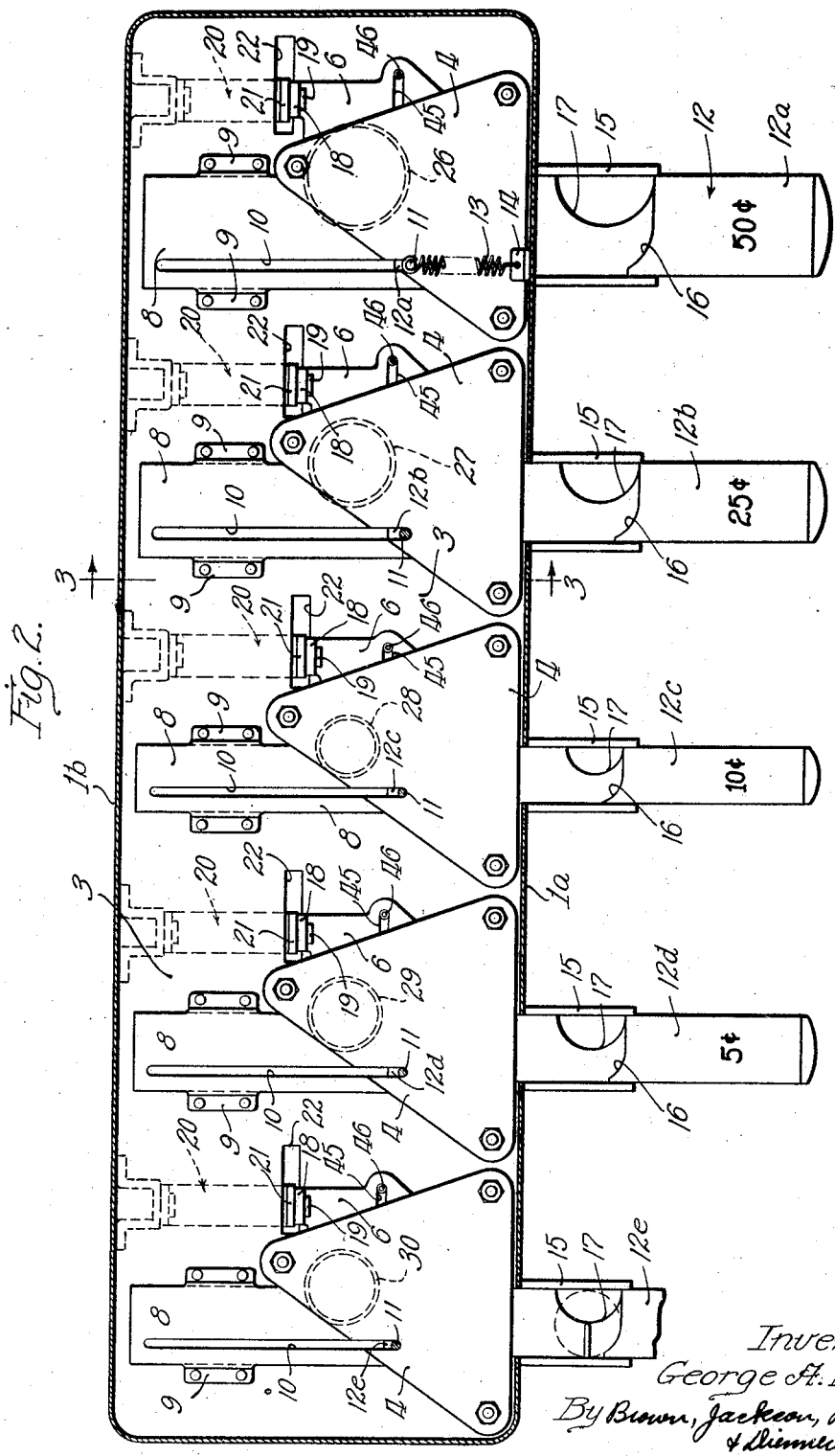

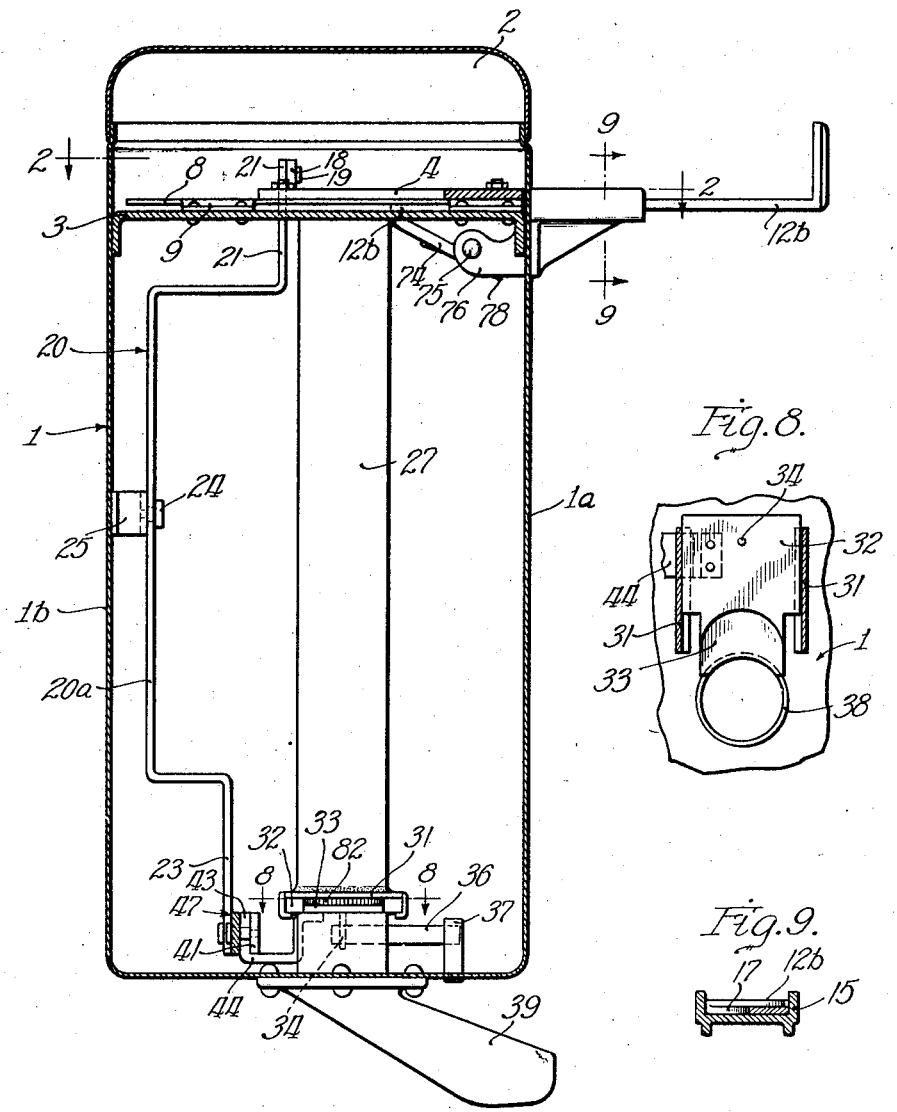

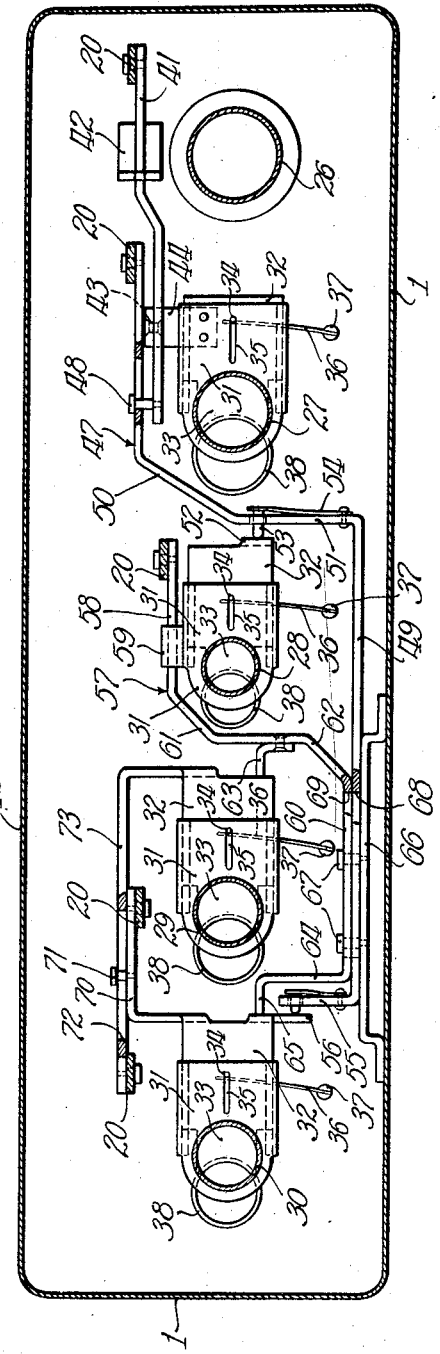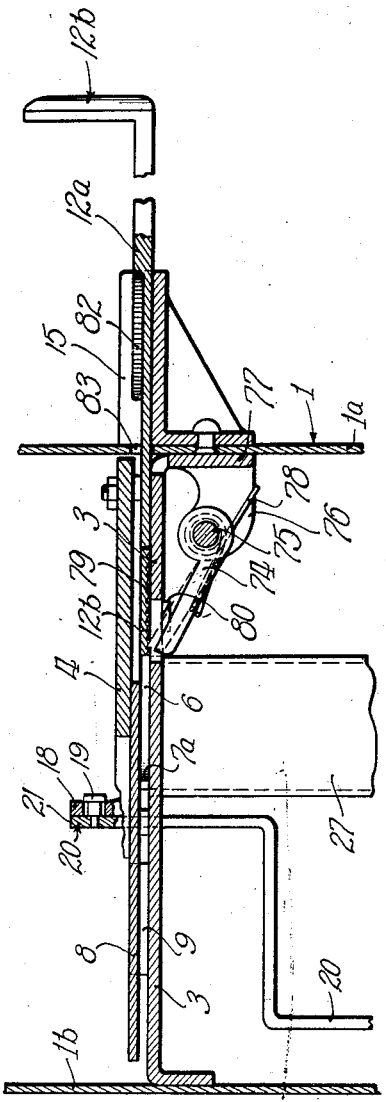

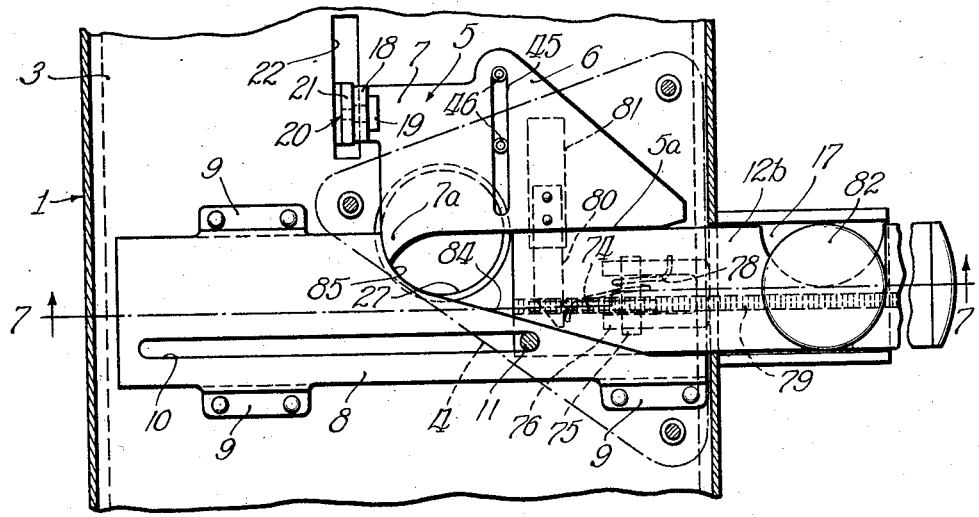

Patented Oct. 13, 1931

1,827,312

UNITED STATES PATENT OFFICE

GEORGE A. FRANKS, OF CHICAGO, ILLINOIS, ASSIGNOR OF ONE-THIRD TO ROBERT W. SEYMOUR AND ONE-THIRD TO MERLE T. WETTON, BOTH OF CHICAGO, ILLINOIS

SLUG AND CHANGE MAKING MACHINE

Application filed February 4, 1929. Serial No. 337,401.

This invention relates to a combination dispensing and change making machine, and more particularly to a machine for delivering a telephone slug, such machine being coin controlled and also comprising means for delivering the proper change when a coin of greater value than the cost of the slug is inserted into the machine.

It is a common practice to install telephone pay stations in drug stores, hotels, railway stations and other public or semi-public places. The instruments at such stations are automatic and are controlled by a slug inserted into the instrument. A person desiring to use the telephone is put under the necessity of buying a slug and, if he does not have the correct change to pay for the slug, he is placed to the further inconvenience of waiting until change is made. This causes inconvenience and delay not only to the person desiring to use the telephone but also to the clerk or attendant of the store, or other place where the phone is located.

If it so happens that the party desiring to use the telephone enters a store which is more or less crowded with customers, and the clerk is aware that such party does not desire to purchase any article but merely to make a telephone call, he is frequently kept waiting until all of the other customers have been attended to. I avoid this possibility, as well as effecting a material saving in time and inconvenience to all parties concerned, by providing a machine which will not only dispense the telephone slugs but will also give the correct change or the difference in value between the coin inserted into the machine.

One of the main objects of my invention is to provide a machine particularly adapted for dispensing telephone slugs and for making the proper change, this machine being of comparatively simple and inexpensive construction. A further object is to provide a machine of this character capable of being operated by coins of different values. Further objects and advantages of my invention will appear from the detailed description.

In the drawings:

Figure 1 is a front view of a machine constructed in accordance with my invention, partly broken away and in section;

Figure 2 is a sectional view taken substantially on line 2—2 of Figure 3;

Figure 3 is a sectional view taken substantially on line 3—3 of Figure 2;

Figure 4 is a sectional view taken substantially on line 4—4 of Figure 1;

Figure 5 is a fragmentary sectional view on an enlarged scale showing, in plan, the coin slide, the operating head, and associated parts, the slide being in its outermost position;

Figure 6 is a view similar to Figure 5 showing the coin slide as inserted to within a short distance of its innermost position;

Figure 7 is a section, on an enlarged scale, taken substantially on line 7—7 of Figure 5;

Figure 8 is a section taken substantially on line 8—8 of Figure 3;

Figure 9 is a section taken substantially on line 9—9 of Figure 3.

I have illustrated the machine as comprising a sheet metal casing 1 within which the dispensing and change making mechanism are disposed, this casing being of rectangular cross section both longitudinally and vertically. A suitable cover or closure member 2 closes the top of casing 1 and may be secured thereto in any suitable or preferred manner which need not be illustrated.

A plate 3 of channel cross section is suitably secured in casing 1 adjacent the upper end thereof, this plate extending the full width and length of the casing. Upper guide plates 4 of substantially triangular shape are mounted upon the upper face of plate 3 adjacent the front of the casing, as in Figure 2.

These plates are spaced away from plate 3 in a known manner, as in Figure 7, and coact therewith for receiving and guiding operating heads 5 (Figure 5). Each of the heads 5 comprises a substantially triangular nose portion 6 and a substantially rectangular body 7. A guide strip 8 is secured to the upper face of plate 3, by means of angularly disposed depending pins 9, or in any other suitable manner, this strip being also spaced above the plate. Strip 3 is provided with a longitudinally extending slot 10 which receives a pin 11 secured in one corner of an elongated rectangular coin slide or plunger 12. This plunger is normally held in its outer or projected position by a tension spring 13 (Figure 2) the inner end of which is secured to pin 11, the outer end of this spring being secured to a bracket 14 suitably secured to the inner face of the front wall of the casing.

The plunger or slide 12 operates in a supporting and guide bracket 15 of channel cross section secured to the outer face of the front wall of the casing, this bracket being aligned with a slot through front wall 1a of the casing through which the plunger operates. The plunger is provided with an outer thickened portion 12a forming a shoulder 16. The plunger is cut away from the edge thereof which is directed toward the associated operating head 5 to provide an arcuate cut or recess 17 which corresponds in radius to the radius of the coin to be used with the selected plunger.

Referring more particularly to Figures 5 and 6, head 5 is provided with a straight edge 5a which, when the head is in its normal inoperative position contacts the inner edge, that is, the adjacent edge of plunger 12. At its rearward end the body 7 of head 5 is provided with an extension 7a having an arcuate forward edge which is curved on the radius of the coin used with the particular slide or plunger selected. I have illustrated my machine as provided with five coin slides or plungers which I have designated 12, 12b, 12c, 12d and 12e, these slides being adapted for reception of a 50¢ piece, a 25¢ piece, a dime, a nickel, and a telephone slug, respectively.

In Figures 5 and 6 I have illustrated the coin slide or plunger for use with a 25¢ piece, and associated parts. The operating head 5 is provided, at the other rear corner thereof, with an upturned tab 18 which is connected by pin and slot connections 19 to the upper end of the lever 20, the upper arm 21 of which extends through a slot 22 through plate 3. As more clearly shown in Figure 3, this lever comprises a body of substantially U-shape and an upper arm 21 extending from the upper end of this body and the lower arm 23 extending downwardly from body 20a of the lever. Body 20a of the lever is pivoted intermediate in them at 24, on a suitable support or bracket 25, suitably secured to back wall 1b of the casing.

Five coin receiving tubes 26, 27, 28, 29, and 30, are disposed vertically in casing 1, the upper ends of these tubes being tightly secured through aligned openings in plate 3.

The tubes 26 to 30 are adapted to receive half dollars, quarters, dimes, nickels and telephone slugs, respectively. Referring more particularly to Figures 1 and 8, a plate 31 is welded or otherwise suitably secured on the lower end of each of the tubes, with the exception of tubes 26. This plate is provided, at each side thereof, with a channel guide element formed by bending the plate downwardly and then inwardly. A dispensing member 32 is slidably mounted in each plate and is provided, in the ends thereof adjacent the tube, with a recess for reception of the coin, or coins to be dispensed. The recessed or relative thin portion 32a of the dispensing plate normally extends beneath the adjacent coin tube so that the lowermost coin of the stack in such tube is disposed in the recess 33. This recess is of arcuate shape, corresponding in radius to the radius of the coin to be received therein. As will be noted more clearly from Figure 8, recess 33 is disposed in alignment lengthwise of the casing with its associated coin tube. A guide pin 34 is secured through the dispensing plate 32, the upper end of this pin operating in a slot 35 in plate 31. A leaf spring 36 is secured, at its outer end, to a stud 37 which is suitably secured to the bottom wall of the casing, the inner end of this leaf spring bearing against the lower portion of pin 34 and urging the dispensing plate or slide 32 away from the associated coin tube so as to normally hold it in inoperative position. When the dispensing slide is in inoperative position the end thereof remote from pin 34 is substantially coincident with a short discharge tube 38 secured through the bottom wall of casing 1, this tube being offset relative to the associated coin tube.

When in this position, the slide 32 leaves the tube 38 unobstructed so that a coin delivered thereto can pass to the tube 38 into a suitable receptacle 39 secured to the under face of the bottom of the casing. I have shown a receptacle, in the form of a cup, for each of the coin discharge tubes, as well as the slug discharge tube, though this is not essential and a suitable trough or other structure common to all of the tubes may be used if desired.

Referring more particularly to Figures 3 and 4, the lower arm 23 of lever 20 associated with plunger 12 is connected, by pin and slot connections (Figure 1) 40, to a link 41 slidable through a guide bracket 42 suitably secured to the upper face of the bottom of the casing 1. This link is secured, at 43, to a bracket 44 which is secured to dispensing slides 32 adjacent coin tube 27. The leaf spring 36 acts, through the dispensing slide 32 and links 41, to hold the operating head 5 in its normal position adjacent the associated coin slide or plunger. In the same manner the operating head associated with the other coin slides or plungers are normally held in inoperative position, the position of the head for the 25¢ or quarter plunger being illustrated in such position in Figure 5. Each of the heads 5 is provided with a transversely extending slot 45 through which extend two guide pins 46 which are secured in plate 3. These pins serve to guide the head 5 and to limit movement thereof in a direction toward the associated coin slides.

Lever 20 of the quarter coin slide or plunger has its lower end secured by pin and slot connections to one end of an operating rod 47 which is conveniently formed from a suitable length of flat strip material bent into desired shape. Link 41 is connected, at its other end, to rod 47 by a pin and slot connection 48. Rod 47 is bent toward the front of the casing so as to pass between coin tube 27 and dispensing slide 32 of tube 28 (Figure 4). This rod is then extended somewhat beyond the tube 29 and is bent inwardly, providing a U-shaped portion 49 which is connected to the portion of the bar adjacent tube 27 by an inclined element 50. Portion 49 comprises an arm 51 which extends across a finger 52 depending from dispensing slide 32 of tube 28. This arm is normally spaced from finger 52 and is provided with an opening through which extends a stud 53 secured to one end of a leaf spring 54 suitably secured at its other end to arm 51. Arm 55, at the other end of U-portion 49 of rod 47, is provided with a similar stud and spring, the stud contacting a finger 56 extending from dispensing slide 32 of the slug tube 30. The lower end of lever 20 associated with coin plunger 12c is connected by pin and slot connections to an operating rod 57 which comprises a shank 58 slidable through a bracket 59 secured to the supporting and guide plate 31 at the lower end of tube 28. The rod 57 comprises a substantially U-shaped portion 60 connected to shank 58 by an inclined element 61. The U-shaped portion 60 includes an arm 62 extending between tubes 28 and 29.

An angle member 63 is secured on this arm and is disposed to contact dispensing slide 32 of tube 29. Arm 64, at the other end of portion 60 of rod 57 is bent at right angles to provide a finger 65 disposed to contact 56 of dispensing slide 32 of tube 30. The U-shaped portions of the arms 47 and 57 are mounted for independent sliding movement on a bracket 66 secured to the front wall of the casing, this bracket carrying pins 67 secured therein and passing through slots 68 and 69 in the arms 47 and 57, respectively, the pin 67 being headed as illustrated to confine the arm 57 against movement toward the rear of the casing. Lever 20 associated with the 5¢ or nickel coin plunger is connected at its lower end, by a pin and slot connection, to an L-shaped arm 70 extending from dispensing slide 32 of the tube 30, this arm being preferably formed integrally with the slide. A headed pin 71 is secured in arm 70 and extends through a slot 72 in an L-shaped arm 73 which is formed integrally with dispensing slide 32 of tube 29 and is directed oppositely to arm 70. The end of arm 73 adjacent the slug tube 30 is connected by a pin and slot connection to the lower end of lever 20 associated with the slug slide or plunger.

It is desirable that means be provided whereby withdrawal of the coin or slug slide, or plunger, after initial inward movement thereof, be prevented until the slide or plunger has been moved into its innermost position for depositing the coin or slug in the tube therefor. With this object in view, I provide a pawl 74 beneath each of the plungers, this pawl being pivoted on a pin 75 secured in a bracket 76.

This bracket may conveniently be formed from the forward flange 77 of plate 3 by suitable cutting and bending of such flange or, if desired, the bracket may be formed separately and suitably secured either to the flange of the plate or to the front wall of the casing. Referring more particularly to Figure 7, the pawl 74 is urged upwardly by a wire spring 78, one arm of which engages beneath the pawl, the other arm of this spring being extended beneath the bracket 76, and the body of the spring being mounted upon pin 75. Plunger 12b is provided, in its under face, with a centrally disposed rack bar 79 formed integrally therewith by suitably cutting the plunger. The teeth of this bar are so directed that, when engaged by pawl 74, withdrawal of plunger 12b is prevented. A trip finger 80 is secured to the under face of head 5, by being riveted thereto, or in any other suitable manner, the portion of this finger which is secured to the head being relatively thick so that the main portion of the finger is disposed beneath plate 3 and adjacent the under face thereof. Plate 3 is provided with a slot 81 (Figure 5) which accommodates movement of the finger with the head. As will be noted more clearly from Figures 5 and 7, the operative end of finger 80 is inclined transversely from its rearward edge toward its forward edge and in a direction away from head 5, this inclined edge of the finger being beveled as in Figure 7 so as to engage between pawl 74 and the under face of plate 3. When the slide 12b is in its outer or normal position of Figure 5, finger 80 is disposed between the pawl and plate 3 (Figure 5) and holds the pawl in inoperative position out of engagement with the teeth of rack 79, as in Figure 7.

If it is desired to obtain a telephone slug and the party wishing to telephone has no coin smaller than a quarter, this coin is placed upon coin slide 12b in contact with the shoulder and the inner end of thickened portion 12a, as in Figures 5 and 7. The coin slide is then pushed inwardly, the coin 82 moving therewith into the casing through slot 83. Guide plate 8 is cut to provide an inclined edge 84 extending from a point adjacent the front edge of this plate to an arcuate portion 85 coincident with a portion of the upper end of coin receiving tube 27. As the slide moves inwardly the coin contacts edge 84 and is shifted transversely of the slide toward operating head 5 with which the coin contacts. Continued movement of the slide causes movement of head 5 in a direction away from edge 84 of plate 8. During the initial movement of head 5 trip finger 80 is withdrawn from between pawl 74 and plate 3, at which time the pawl is moved into operative position for engagement with rack 79 thus preventing withdrawal of slide 12b. When slide 13b has been moved into its innermost position, the coin 82 is directly over the tube 27 and drops into the tube by gravity. Ordinarily no difficulty will be encountered in this discharge of the coin into the tube since the area of contact between the coin and head 5 and plate 8 is relatively small and the pressure exerted on the head is comparatively slight. The arcuate cut-out or recess 17 in slide 12b registers with the upper end of the coin tube so that the coin, in its passage into the tube, passes downwardly through this recess.

Though ordinarily, no difficulty should be experienced in the discharge of the coin into the tube in the manner described, I contemplate the provision of any suitable means for ejecting the coin from between the operating head 5 and the edge of plate 8 into the tube if this seems desirable.

As the slide 12 reaches its inner most position, operating head 5 actuates the dispensing slide of the associated tube, or more correctly, of the tube or tubes, as the case may be, controlled by the particular coin slide operated for discharging from the machine a telephone slug and the correct change. Referring more particularly to Figure 4, if a half dollar be placed upon the slide 12 and this slide be then moved into its innermost position, the lower end of lever 20 connected to link 41 will be moved toward the left as submitted in Figure 4. This movement of link 41 will move the slide 32 of tubes 27, 28 and 30 toward the left so as to remove a quarter from tube 27, two dimes from tube 28, and a telephone slug from tube 30. When the half dollar has reached its innermost position, the slides referred to are disposed in their extreme position at the left with the coins and the slugs disposed in alignment with the discharge tubes 38. At this time the coins in the tubes 27 and 28, and the slugs in the tube 30, are supported by the coins in the dispensing slides 32 and the slug in the dispensing slide beneath the slug tube. When the 50¢ piece drops into tube 26 head 5 is released and lever 20 is moved by the spring 36 so as to return this head to its normal position. These springs also act to quickly return the dispensing slide 32 beneath the tubes 27, 28 and 30 to inoperative position at the right of the respective tubes.

Return of the coins and the slugs with these dispensing slides is prevented by the superimposed weight of the coins and slugs in the tubes. As a result, a quarter, two dimes, and a telephone slug are discharged through the tubes 38 into the cup 39. A person desiring to telephone is thus enabled to buy a slug and to obtain the proper change without delay or any inconvenience to himself or anyone else. Referring to Figure 1, it will be noted that the upper face of the dispensing slide 32 is, in each instance, spaced a short distance away from the lower end of the coin or slug tube and the depth of the recess 33 of such dispensing plate, with the exception of the plate associated with tube 28, is slightly less than the thickness of the coin which this recess receives. The depth of the recess of plate 32 associated with tube 28 is slightly less than twice the thickness of a dime so that this plate receives two dimes in superposed relation. It will thus be apparent that the weight of the coins and slugs remaining in the tube is supported by the coins or slugs in the dispensing plate 32 when these plates have been moved into extreme position to the left, for causing discharge of the coins and slugs therefrom through the tube 38 in the manner described.

When a quarter is inserted into the machine, the rod 47 will be shifted toward the left so as to operate the dispensing slide 32 of the tube 28 and the dispensing slide 32 of the tube 30.

Due to the pin and slot connection 48 between link 41 and rods 47, the lever 20 associated with tube 26 will not be affected and, in the operation of rod 47, the dispensing slides for tubes 28 and 30 only will be actuated. As a result, when a quarter is inserted into the machine, two dimes and a slug will be delivered. When a nickel is inserted into the machine the dispensing slide 32 of tube 30 will be actuated for discharging a slug. Due to the pin and slot connection between arms 70 and 73, and the fact that rods 47 and 57 are not secured to dispensing slide 32 of tube 30, no other slide than the slides for dispensing or discharging a telephone slug will be operated when a nickel is inserted.

It not infrequently happens that after a person obtains a slug, they are unable to obtain the connection desired, in which place the slug is returned in a known manner. Under present conditions, it may frequently be necessary for the purchaser of the slug to wait a considerable length of time before being able to obtain the refund on the slug. As a result, it frequently happens that rather than wait, the purchaser of the slug leaves the store without obtaining a refund and, in the great majority of cases, the slug is never used with a resulting loss to the purchaser. This is avoided by the provision of the arm 73 and the associated slug slide or plunger. If the slug is not used, the purchaser thereof places it in the slug slide which is then forced inwardly into the machine in the same manner as the coin slide and actuates the lever 20 connected to arm 73. This lever is disposed to shift arm 73 toward the left, the return slugs dropping into the tube 30 and a nickel being discharged from the tube 29.

Due to the pin and slot connection between the arms 70 and 73, this movement of arm 73 does not in any way affect the dispensing slide 32 of tube 30. It will also be noted that finger 63 of rod 57 is not secured to the dispensing slide 32 of tube 29 so that when this slide is operated none of the other slides of the machine are affected.

It is desirable that means be provided for conveniently removing the coins from tubes 26. For this purpose any suitable or preferred form of removable closure may be provided for the lower end of this tube. Preferably such a closure should be capable of being locked to prevent unauthorized removal of the coin.

It may be found desirable, in practice, to provide suitable mechanism for preventing the use of spurious coins in the machine, as well as to provide means for locking the coin slides or plungers against movement when the coin tubes for delivering the proper change for a given coin are emptied. It may also be desirable to provide means for receiving coins when the tubes have been filled, the coin in such case passing beyond the tube associated with the slide for such coin and being deposited into a suitable receptacle. Coin detecting devices of various sorts are known in the art, and locking devices of the character referred to are also common. It is also a common expedient to provide overflow receptacles and associated mechanism. I contemplate employing any or all of the devices and mechanisms referred to if found desirable, but I have not illustrated nor shown such mechanisms herein as they form no part of the present invention.

It is to be clearly understood, however, that the omission of the devices and mechanisms referred to, is for the sake of clearness in illustration and that I contemplate the use of devices of this character if desired.

In practice, the machine is installed in a suitable location, other than a phone booth or similar closure, where it will be readily observable by the clerks in a store or the attendants at a telephone station, to discourage tampering with the machine in an endeavor to improperly extract coins therefrom. My invention is particularly intended and adapted for use in dispensing with telephone slugs and making proper change, but in its broader aspects my invention contemplates the use of a machine of this character for dispensing other articles of various sorts, and for making proper change for the difference in value of the coin inserted into the machine and the price of such article.

What I claim is:

1. In a machine of the character described, a tube for articles to be dispensed, a plurality of coin receiving tubes, coin controlled means for dispensing an article from said article tube and for discharging coins from the coin tubes selectively in accordance with the value of the coin inserted into the machine and of a value equal to the difference between the price of the article and the value of such coin, and means actuated by return of the discharged article to the machine for discharging from said machine a coin equal in value to the price of such article.

2. In a machine of the character described, a tube for reception of articles to be dispensed, a plurality of coin tubes for reception of coins of different values, slides associated with the respective coin tubes for inserting coins into the machine and discharging them into the tube, coin actuated means associated with the respective slides for dispensing an article from the article tube and for discharging coins from selected coin tubes to the amount of the difference in value between the price of the dispensed article and the value of the inserted coin.

3. In a machine of the character described, a tube for reception of articles to be dispensed, a plurality of coin tubes for reception of coins of different values, coin slides associated with the respective tubes for insertion of coins into the machine and discharge thereof into the tubes, operating heads movable toward and away from the respective slides, means coacting with a coin inserted in a selected slide for moving the head in operating direction, dispensing slides adjacent the respective tubes and disposed to receive coins and articles therefrom, and connections between said slides and the operating head for discharging an article from said article receiving tube and for discharging coins from selected ones of the coin tubes in accordance with the value of the coin inserted, the coins discharged being equal in value to the difference between the value of the inserted coin and the price of the dispensed article.

4. In a machine of the character described, a tube for containing articles to be dispensed, a plurality of coin receiving tubes for coins of different values, slides associated with the respective coin tubes for inserting coins of different values into the machine, and coin actuated means associated with the respective slides for dispensing an article from the article receiving tube and for simultaneously discharging coins from the coin tubes, selectively, of a value equal to the difference between the price of the dispensed article and the inserted coin.

5. In a machine of the character described, a tube for containing articles to be dispensed, a plurality of coin tubes for reception of coins of different values, slides associated with the respective coin tubes for inserting coins into the machine, a slide associated with the article tube for returning a dispensed article to the machine, means actuated by a coin inserted into the machine for dispensing an article therefrom and for discharging from the coin tubes selectively, coins equal in value to the difference between the value of the coin inserted into the machine and the price of the dispensed article, and means for discharging from a selected one of the coin tubes a coin equal in value to the price of the article dispensed, the last mentioned means being actuated by return of the dispensed article to the machine.

6. In a machine of the character described, a vertically disposed tube for reception of articles to be dispensed and a plurality of vertically disposed tubes for reception of coins of different values, means at the lower ends of the respective tubes for discharging the articles and coins therefrom, said discharging means comprising slidably mounted dispensing members, yielding means normally holding the dispensing member in inoperative position, slides associated with the respective tubes for inserting coins into the machine and for returning dispensed articles thereto, means actuated by insertion of the coin into the machine for operating the dispensing slide of the article receiving tube and for selectively operating the dispensing slides of the coin tubes in accordance with the value of the coin inserted into the machine.

7. In a machine of the character described, a tube for reception of articles to be dispensed, a plurality of tubes for reception of coins of different values, means comprising slidably mounted dispensing members for discharging coins from the coin tubes and for dispensing articles from the article tube, slides for inserting coins into selected ones of the coin tubes, a slide for returning a dispensed article to the article tube, levers associated with the respective tubes, coin actuated means for operating the respective levers, means connected to the levers and operated thereby for operating the dispensing slide of the article tube and selectively operating the dispensing slides of the coin tubes in accordance with the value of the coin inserted, and means actuated by an article returned to the machine for operating the dispensing slide of a selected one of the coin tubes for discharging therefrom a coin equal in value to the price of the returned article.

8. In a machine of the character described, a tube for telephone slugs and articles of like nature to be dispensed, a plurality of coin tubes adapted for reception of coins of different values, means for inserting coins into the different tubes, selectively, and for returning a dispensed slug to the slug receiving tube, and means actuated by a coin inserted into the machine for dispensing a slug and for discharging coins from the coin tubes, selectively.

9. In a machine of the character described, a tube for containing telephone slugs and articles of like nature to be dispensed, a plurality of coin tubes for reception of coins of different values, means for discharging a slug and for simultaneously discharging from the coin tubes, selectively, coins equal in value to the difference between the value of the inserted coin and the slug, and means for discharging from the machine a coin equal in value to the slug, the last mentioned means being actuated by return of the slug to the machine.

10. In a machine of the character described, a tube for reception of telephone slugs and like articles to be dispensed, a series of tubes for reception of quarters, dimes, and nickels, respectively, disposed in alignment with the slug tube and the value of the coin in the tubes of said series increasing in accordance with the distance of the tube from said slug tube, a tube for reception of half dollars beyond the quarter tube, slides for inserting coins into the respective coin tubes, means for discharging slugs from the slug tube and for discharging coins from the coin tube, means actuated by a half dollar inserted into the machine for operating the quarter and dime discharging means and the slug discharging means, means operated by a quarter inserted into the machine for operating the dime discharging means and the slug discharging means, means actuated by a dime inserted into the machine for operating the nickel discharging means and the slug discharging means, and means operated by a nickel inserted into the machine for actuating the slug discharging means.

11. In a machine of the character described, a tube for reception of telephone slugs and like articles to be dispensed, a tube for reception of coins equal in value to the slug or like article, a slide for inserting coins into the coin tube, a slide for returning such articles to the article tube, means actuated by a coin inserted into the machine for dispensing an article from the article tube, and means actuated by a dispensed article returned to the machine for discharging a coin from the coin tube.

In witness whereof, I hereunto subscribe my name this 31st day of January 1929.

GEORGE A. FRANKS.